United States Patent [19]

Iacoviello

[11] 4,332,850

[45] Jun. 1, 1982

[54] VINYL ACETATE-ETHYLENE EMULSIONS FOR NONWOVEN GOODS

[75] Inventor: John G. Iacoviello, Allentown, Pa.

[73] Assignee: Air Products and Chemicals, Inc., Allentown, Pa.

[21] Appl. No.: 267,271

[22] Filed: May 26, 1981

[51] Int. Cl.³ .............................................. D04H 1/58
[52] U.S. Cl. ..................................... 428/288; 526/80; 523/344; 523/347
[58] Field of Search ................ 428/288; 260/29.6 TA; 526/80

[56] References Cited

U.S. PATENT DOCUMENTS

| | | | |
|---|---|---|---|
| 3,081,197 | 3/1963 | Adelman | 117/140 |
| 3,137,589 | 6/1964 | Reinhard et al. | 117/140 |
| 3,288,740 | 11/1966 | Maeder et al. | 260/29.6 |
| 3,380,851 | 4/1968 | Lindemann et al. | 117/140 |
| 3,404,113 | 10/1968 | Lindemann et al. | 260/29.6 |
| 3,498,875 | 3/1970 | Lindemann et al. | 161/170 |
| 3,708,388 | 1/1973 | Lindemann et al. | 161/247 |
| 3,770,680 | 11/1973 | Iacoviello | 260/29.6 |
| 3,844,990 | 10/1974 | Lindemann et al. | 260/17 R |

FOREIGN PATENT DOCUMENTS 991550  5/1965  United Kingdom ............... 260/29.6

*Primary Examiner*—James J. Bell
*Attorney, Agent, or Firm*—Russell L. Brewer; E. Eugene Innis; James C. Simmons

[57] ABSTRACT

This invention relates to a vinyl acetate-ethylene copolymer containing emulsion particularly adapted for the preparation of nonwoven goods. The vinyl acetate-ethylene emulsion is prepared by an improved process for producing an aqueous emulsion suitably adapted for producing non-woven goods said emulsion containing a vinyl acetate-ethylene copolymer wherein said copolymer contains from about 75-96% by weight of vinyl acetate. It is produced by forming an aqueous suspension of vinyl acetate, ethylene, and stabilizer, initiating the polymerization of the reaction mixture by the addition of catalysts, and adding from about 0.5-10% by weight of the vinyl acetate of a crosslinkable monomer. The improvement for enhancing the absorptivity of the copolymer comprises:

pressurizing the reactor with ethylene to an initial ethylene equilibrium pressure of from about 100 to 1,000 psig;

initiating the reaction mixture by the addition of catalyst at a temperature from about 10°–35° C. and bringing the reaction mixture to a reaction temperature of from 45°–85° C. and operating pressure within a period of not more than 2 hours and the reaction temperature exceeds the initiation temperature by at least 20° C.;

adding the crosslinkable monomer at a substantially uniform rate such that the major portion of monomer has been added by the time the vinyl acetate content in the emulsion has been reduced to a level of from 3–25% by weight of the emulsion;

and continuing polymerization of the reaction mixture until the vinyl acetate content in said emulsion is reduced below about 1% by weight.

12 Claims, No Drawings

VINYL ACETATE-ETHYLENE EMULSIONS FOR NONWOVEN GOODS

BACKGROUND OF THE PRIOR ART

Vinyl acetate-ethylene emulsions have been widely used as binders for, inter alia, paints, adhesives, and as binders for nonwoven and woven goods. The vinyl acetate-ethylene emulsions used for nonwoven goods generally contain a crosslinkable monomer, the crosslinking function being exercised after the emulsion is applied to a loosely assembled web of fibers. The crosslinking function serves to improve wet strength, dry strength, and solvent resistance in the goods.

Representative patents relating to vinyl acetate-ethylene emulsions and their use in various applications include:

U.S. Pat. No. 3,380,851 discloses a process for producing nonwoven fabrics by bonding together a loosely assembled web of fibers with the binder comprising an interpolymer of vinyl acetate-ethylene-N-methylol acrylamide where the interpolymer contains from 5 to 40% by weight ethylene and from 0.5 to 10% N-methylol acrylamide by weight of the vinyl acetate. The emulsion is prepared by first forming a polymerization recipe of vinyl acetate, water, nonionic surfactant, reducing agent and, optionally, hydroxyethyl cellulose. The polymerization recipe is heated to a temperature of 50° C. although broadly 0° to 80° C. and pressurized with ethylene to an operating pressure ranging from about 10 to 100 atmospheres with sufficient time being permitted for the ethylene to saturate the vinyl acetate. At that time the recipe is initiated by addition of oxidizing agent (catalyst) and polymerization effected until the vinyl acetate concentration falls below about 1% generally 0.5% by weight of the emulsion. N-methylol acrylamide is added incrementally to the reactor during polymerization, and it generally takes approximately 4–5 hours for such addition.

U.S. Pat. No. 3,498,875 discloses a process for producing bonded nonwoven fabrics in a manner similar to the '851 patent except that the interpolymer comprises vinyl acetate, ethylene and a crosslinkable monomer of glycidyl acrylate. The polymerization process is essentially the same as the '851 patent wherein the vinyl acetate and ethylene are initially charged to the reactor and the glycidyl acrylate added incrementally during the polymerization. Normally such addition is completed in about 2 hours or within 40 to 50% of the totally polymerization time.

U.S. Pat. No. 3,137,589 discloses a process for producing bonded fiber fleeces by using a binder consisting of a thermoplastic polyvinyl compound incorporating a crosslinkable monomer. The particular monomer used for effecting the crosslinking function is an N-methylol amide of acrylic acid or methacrylic acid or maleic acid. By and large the copolymers are acrylic type copolymers e.g. a mixture of butyl and methylmethacrylate and N-methylol acrylamide.

U.S. Pat. No. 3,081,197 discloses a process for producing nonwoven fabrics bonded with an interpolymer of vinyl acetate, 0.3 to 12% crosslinkable monomer, e.g., N-methylol acrylamide, glycidyl acrylate, glycidyl methacrylate or allyl glycidyl ether and an internal plasticizer of vinyl pelargonate or polyethylene glycol methacrylate and so forth. It is reported that the nonwoven fabrics have good wet strength and dry strength as well as water absorbency.

U.S. Pat. No. 3,708,388 discloses vinyl acetate-ethylene copolymer latexes having particular adaptability for lamination. The vinyl acetate-ethylene emulsion optionally incorporates a crosslinking monomer of the post reactive type and these include glycidyl vinyl ether, glycidyl methacrylate, N-methylol acrylamide. The process set forth in '388 patent is essentially the same as that in the '851 reference.

U.S. Pat. No. 3,844,990 relates to a paint composition comprising a vinyl acetate-ethylene copolymer latex having a cellulosic thickener. The vinyl acetate-ethylene copolymer latex contains from about 5 to 40% ethylene and is prepared in essentially the same manner in the '851 vinyl acetate-ethylene emulsions. The basic difference is that no crosslinkable monomer is employed.

U.S. Pat. No. 3,770,680 discloses a process for producing a grit free aqueous polymer emulsion particularly suited as a base for wood adhesive, the polymer comprising reaction product of vinyl acetate, N-methylol acrylamide and acrylic acid.

U.S. Pat. No. 3,404,113 discloses a process for producing an aqueous paint composition comprising a vinyl acetate-ethylene-triallyl cyanurate polymer latex where the ethylene concentration is from 5 to 40% and the triallyl cyanurate is incorporated in an amount from about 0.5–10%. The triallyl cyanurate can be added incrementally or added to the batch prior to initiation. Again, the polymerization procedure is much like that procedure described in the '851 patent.

U.S. Pat. No. 3,288,740 discloses a process for producing aqueous emulsions containing interpolymer having a crosslinkable function e.g. an N-methylol function. Generally the copolymers comprise a lower alkyl ester of acrylic or methacrylic acid in combination with N-methylol acrylamide or the ethers of N-methylol acrylamide.

British Pat. No. 991,550 discloses a process for producing emulsions of vinyl acetate and ethylene. A polymerization is carried out at a temperature of from about 50° to 70° C. at pressures from 10 to 100 atmospheres generally 20 to 60 atmospheres. The process for preparing emulsions differs generally from that of the '851 patent in that the vinyl acetate is added continuously during the reation period rather than being added initially to the recipe. The delayed addition of vinyl acetate permits greater incorporation of ethylene into the polymer.

The inventors are also aware of a process to produce vinyl acetate-ethylene adhesive emulsions having a Tg of about 15°–19° C. One initiates polymerization of a recipe of vinyl acetate, ethylene, water, stabilizer and reducing agent at a temperature of 25° C. and a pressure below the operating pressure. The heat of reaction is utilized to achieve the operating temperature and operating pressure.

SUMMARY OF THE INVENTION

This invention relates to an improvement in a process for producing vinyl acetate-ethylene emulsions particularly adapted for the preparation of nonwoven goods and to nonwoven goods having an improved rate of water absorption. Such goods are made by incorporating vinyl acetate-ethylene-crosslinkable monomer emulsions prepared by the improved process into a loosely assembled web of fibers in a conventional manner. The copolymer is produced by a process for producing an aqueous emulsion suitably adapted for producing non-woven goods said emulsion containing a vinyl acetate-ethylene-crosslinkable monomer copolymer wherein said copolymer contains from about 60–96% by weight of vinyl acetate. In the basic process the copolymer is produced by forming an aqueous suspension of vinyl acetate, ethylene, and stabilizer, initiating the polymerization of the reaction mixture by the addition of catalyst, and then adding crosslinkable monomer during the polymerization to provide from about 0.5–10% crosslinkable by weight of the copolymer. The improvement for enhancing the properties of said emulsion comprises:

- pressurizing the reactor with ethylene to an initial ethylene equilibrium pressure of from about 100 to 1,000 psig;
- initiating the reaction mixture by the addition of catalyst at a temperature from about 10°–35° C. and bringing the reaction mixture to a reaction temperature of from 45°–85° C. and operating pressure within a period of not more than 2 hours and the reaction temperature exceeds the initiation temperature by at least 20° C.;
- adding the crosslinkable monomer at a substantially uniform rate such that the major portion of monomer has been added by the time the vinyl acetate content in the emulsion has been reduced to a level of from 3–25% by weight of the emulsion; and
- continuing polymerization of the reaction mixture until the vinyl acetate content in said emulsion is reduced below about 1% by weight.

There are several advantages associated with this process for producing emulsions adapted for nonwoven goods. These are:

First, one achieves a highly energy efficient process by utilizing the heat of reaction to bring the reaction mixture to the reaction temperature and operating pressure;

Second, one achieves a shortened reaction time by virtue of the fact that polymerization is carried out under conditions normally allocated to heat-up and pressurization. The prior art techniques of requiring heat-up to operating temperatures of from 50° to 70° C. prior to initiating require a time delay for these features.

Third, and one of the most significant advantages of the process, is that the particular vinyl acetate-ethylene-crosslinkable monomer containing copolymer has outstanding rates of water absorption. This property makes it highly attractive for preparing nonwoven goods for specific applications, e.g., paper towels.

DESCRIPTION OF THE PREFERRED EMBODIMENTS

Several steps are important in the process for forming aqueous emulsions containing vinyl acetate-ethylene-crosslinkable monomer containing copolymer which are suitable for obtaining the advantages described above. The first step, as with most of the other vinyl acetate-ethylene aqueous emulsion processes, lies in the formation of an aqueous emulsion of vinyl acetate and other components used in the reaction mixture. In this regard, the water is first mixed with a stabilizer, e.g. from about 0.5–5% protective colloid or surfactant, or both, by weight of the copolymer. Then the reducing agent of the redox catalyst system and other components e.g. buffers are added as needed to form a premix.

The premix is then charged to the reactor and the vinyl acetate added. Optionally, the vinyl acetate can be added to the premix. Substantially all, at least 75% by weight, and preferably 100% of the vinyl acetate is added prior to initiation.

Reducing agents, stabilizers, buffers and catalysts used in the practice of this invention are conventional and used in conventional amounts. Examples of reducing agents include the sulfoxylates, bisulfites, and ferrous salts. Specific examples include sodium and zinc formaldehyde sulfoxylate. Catalysts include hydrogen peroxide and benzoyl peroxide. Stabilizing agents include nonionic emulsifying agents such a polyoxyethylene condensates, e.g. polyoxyethylene aliphatic ethers and polyoxyethylene esters of higher fatty acids. Specific examples include polyoxyethylene nonyl phenyl ether and polyoxyethylene laurate; and polyoxyethyleneamides such as N-polyoxyethylenelauramide. The stabilizers are often used in combination with a protective colloid, e.g. hydroxyethyl cellulose or a partially acetylated polyvinyl alcohol. Polyvinyl alcohol protective colloids having a hydrolysis value of from about 80 to 94 and preferably from about 87 to 89% by weight are generally used. Other examples of stabilizers, emulsifying agents, buffers, amounts and methods for forming the emulsion are shown in U.S. Pat. No. 3,380,851 and are incorporated by reference.

After the stabilizer, reducing agent, etc. is dissolved in the mixture of water and vinyl acetate, the premix then can be charged to the reactor (unless made up in the reactor itself). Thereafter, the reactor is initially pressurized with ethylene to provide a minimum ethylene equilibrium pressure of from about 100–1,000 psig. This pressure may be generally less than the operating pressure. Agitation is effected during pressurization and typically ethylene is introduced by subsurface means through spargers to insure that ethylene is rapidly transferred to the vinyl acetate.

Prior to initiation the reaction mixture is adjusted to a temperature of from about 10°–35° C., preferably 15°–30° C. Pressurization of the reaction mixture with ethylene may be prior to or subsequent to this adjustment step. Typically, for commercial reactions, this will be from 400–750 psig. After the reaction mixture is brought to an initial temperature, and the ethylene is present in the vinyl acetate, polymerization of the reaction mixture is commenced by the addition of either the oxidizing or reducing component of the catalyst. Low Tg, e.g. −20° to +5° C. (Tg=glass transition temperature) copolymers can be prepared by adding some ethylene during the reaction or toward the end of the reaction. The amount of ethylene required at the end will depend upon how much ethylene is added in the initial charge and the free space in the reactor.

A crosslinkable monomer is used in preparing the emulsion in an amount to provide from about 0.5 to about 10% by weight, typically from about 2–5% by weight in the copolymer. These crosslinkable monomers are the post-reactive type, i.e., they will cross link upon the application of heat or addition of appropriate catalyst or reactive component to form a thermoset resin. Examples of crosslinkable monomers suited for practicing this invention are the N-methylol amides e.g. N-methylol acrylamide and N-methylol methacrylamide and their lower alkyl ($C_{1-6}$) ethers. In addition crosslinkable monomers such as N-methylol allyl carbamate and lower alkyl ($C_{1-6}$) ethers thereof are suited for practicing the invention. In addition crosslinkable functionality can be imparted by the addition of acids e.g. acrylic and methacrylic acid, acrylamide, unsaturated dicarboxylic acids, e.g. crotonic acid, maleic acid, itaconic acid; and glycidyl acrylate and glycidyl methacrylate.

Most of the crosslinkable monomers suited for producing vinyl acetate-ethylene emulsions particularly adapted for nonwoven goods have a polymerization reactivity greater than vinyl acetate. Such monomers are added at a uniform rate and incrementally during the polymerization to obtain a uniform copolymer. Typically, the addition of the crosslinkable monomer is carried out so that a major portion, e.g. greater than 75%, and preferably all of the monomer is added by the time the vinyl acetate content in the emulsion is reduced to a level from about 3–25%, and preferably 3–8% by weight of the emulsion.

On initiation, the temperature of the reaction mixture begins to rise and on continued addition of catalyst the temperature, and sometimes the pressure, will increase rapidly. Catalyst addition is adjusted to reach a reaction temperature of from about 45° to 85° C., typically 50°–55° C. within about 2 hours, and preferably within 1 hour, and then it is added at a rate to maintain such temperature. The reaction temperature is set to be at least 20° C. above the initiation temperature, and preferably at least 25° C. The reactor is initially pressurized to a preselected initial pressure that will provide a desirable operating pressure, e.g., of from 300–1,500 psig at the reaction temperature. Additional ethylene may be added during the polymerization to produce a copolymer having from about 60 to 96% vinyl acetate. Typically this level of vinyl acetate will translate into a copolymer having a glass transition temperature (Tg) of from about −30° to 20° C.

The vinyl acetate-ethylene-crosslinkable monomer system described are suitably used to prepare nonwoven fabrics by a variety of methods known to the art which, in general, involve impregnation of a loosely assembled mass of fibers with the emulsion followed by moderate heating to dry the mass and effect crosslinking of the binder to achieve a thermoset system. Depending upon the crosslinkable monomer used in the vinyl acetate system a catalyst can be incorporated into the emulsion prior to its application to the loosely assembled mass of fibers or applied subsequent thereto and cured by conventional technique. Acid catalysts such as mineral acids, e.g. hydrochloric aid or organic acids and acid salts such as ammonium chloride are suitably used for effecting cure of an N-methylol containing system, i.e. N-methylol acrylamide or its ethers.

The starting layer or mass can be formed by any one of the conventional techniques for depositing or arranging fibers in a web or layer. These techniques include carding, garnetting, air laying and the like. Individual webs or thin layers prepared by one or more of these techniques can be laminated to provide a thicker layer. Specific examples of nonwoven goods prepared by applying the emulsions of this invention to the webs or laminated layers include paper towels, tissues, sanitary napkins, filter cloths, wrappings for food products, bandages, surgical dressings, etc.

STATEMENT OF INDUSTRIAL APPLICATION

The copolymers of vinyl acetate-ethylene crosslinkable monomers of this invention have excellent water absorption rates, thus making them well suited for use in producing nonwoven goods.

The following examples are provided to illustrate the preferred embodiment of the invention are not intended to restrict the scope thereof.

EXAMPLE 1

A series of polymerization runs were made for preparing a vinyl acetate-ethylene copolymer system in a 15 gallon stirred, stainless steel autoclave, the agitation system involving 2 turbine blades being rotated at 180–200 rpm. Then a premix, either recipe 1 or 2 as described, consisting of vinyl acetate (substantially all is changed, i.e. greater than 80%), water, surfactant and reducing agent, consisting of a ferrous ion in the form of ferrous ammonium sulfate (1% solution), was charged to the reactor. After charging the recipe to the reactor, the reactor was purged with nitrogen and ethylene. Ethylene was then charged to the reactor via subsurface feed and the reactor pressurized to a preselected initial pressure, i.e. either 460 or 700 psig. Once the ethylene was incorporated into the premix polymerization was initiated by addition of oxidizing agent.

In the Tables below essentially two recipes were used. Recipe 1 was used in producing −17° C. Tg product and generally consisted of:

| RECIPE 1 | | |
|---|---|---|
| Vinyl acetate | 40 pounds | |
| Alipal CO-433 (30%) solution | 1,616 grams | variable 2–3% |
| Igepal CO-430 | 75.7 grams | |
| Ferrous ion | 1 gram | |
| Distilled water | 30 pounds | |

Recipe 2 was used to produce 0° C. Tg product, and generally consisted of:

| RECIPE 2 | |
|---|---|
| Vinyl acetate | 50 pounds |
| Alipal CO-433 (30%) solution surfactant | 4.3 pounds-variable 2–4% |
| Igepal CO-430 surfactant | 250 grams |
| Ferrous ion | 1.0 grams |
| Distilled water | 31 pounds |

In carrying out the polymerization reaction times were calculated to be complete within about 3 hours. Assuming that the initial vinyl acetate monomer concentration in the reactor prior to initiation was about 60%, the vinyl acetate content at the end of 1 hour should be approximately 40%, 20% at the end of second hour and less than 1% at the end of third hour. Based on this conversion rate of vinyl acetate the crosslinkable monomer was added to the reaction mixture at a rate such that all of the monomer would be added to the reactor by the time the unreacted vinyl acetate monomer content in the emulsion was from 3 to 8% by weight. The monomer in Runs 1 to 16 were in the 3 to 8% vinyl acetate content range. Runs 17 and 18 were about 20% vinyl acetate content. This level is reached in about 2½ hours thus the crosslinkable monomer was added at a uniform rate (±50%), preferably 120% for 2½ hours. Polymerization was carried out using an activator solution consisting of zinc formaldehyde sulfoxylate (about 7% by weight) and a catalyst system consisting of a peroxide, e.g., t-butyl hydroperoxide or 2% hydrogen peroxide. The grams hydrogen peroxide added per reaction was about 19 to 22 grams for recipes one and two and 26 to 30 grams of zinc formaldehyde sulfoxylate (7.1% solution).

Table 1 below provides data with respect to several vinyl acetate-ethylene emulsions run which were designed to compare favorably to commercially available vinyl acetate-ethylene-N-methylol acrylamide (control) emulsions having Tg's of 0±3 and −16°±2° C., respectively. The process utilized in preparing the commercial emulsions comprises initiating polymerization after the mixture of ethylene and premix had been preheated to the reaction temperature, i.e., 50° C. That temperature was maintained and crosslinkable monomer added on a continuous basis. Initial ethylene pressures are given and runs 1–3A relate to a control emulsion having a Tg of −17° to −20° C. and runs 5–16 relate to a control type emulsion having a Tg of 0°±3° C.

lenoxy) ethanol, Alipal 433 is a sodium salt of sulfated nonyl phenoxy poly(ethyleneoxy) ethanol.

TBHP refers to t-butyl hydroperoxide. With respect to Table II % solids were measured as Cenco balance solid. Brookfield viscosity is measured using a Brookfield viscometer at 25° C. No. 2 spindle. The symbol ' represents minutes, and " represents seconds.

In evaluating the effectiveness of the copolymer in terms of producing non-woven goods, No. 4 Whatman chromatography paper was impregnated with the emulsion at various "add on" levels, i.e., the weight of copolymer vs. the weight of the paper and then evaluated in conventional manner. The tensile strength under dry, wet (water) and perchlor conditions were measured with an Instron testing machine. Wet and perchlor testing is carried out by immersing the paper having cured copolymer thereon into water and perchloroethylene,

TABLE I

| RUN | SURFACTANT | % | INITIAL ETHYLENE PSIG | CAT | PERCENT AA | AM | NMA |
|---|---|---|---|---|---|---|---|
| 1 | Triton 301 | 3 | 700 | TBHP | — | — | 3.45 |
| 2 | Triton 301 | 3 | 700 | TBHP | | | 3.45 |
| 3 | Igepal 430 Alipal CO433 | 2 | 700 | $H_2O_2$ | | | 5.0 |
| 3A | Igepal 430 Alipal CO433 | 2 | 700 | | 1 | | 5.0 |
| 4 | Triton 301 | 3.0 | 460 | $H_2O_2$ | | | 5.0 |
| 5 | Igepal CO430 Alipal CO433 | 3.0 | 460 | $H_2O_2$ | 0.5 | | |
| 6 | Igepal CO430 Alipal CO433 | " | " | " | 1.0 | | |
| 7 | Igepal CO430 Alipal CO433 | " | " | " | 0.5 | | 3.5 |
| 8 | Igepal CO430 Alipal CO433 | " | " | " | 2.0 | | 3.5 |
| 9 | Igepal CO430 Alipal CO433 | " | " | " | | 1.23 | 1.75 |
| 10 | Igepal CO430 Alipal CO433 | " | " | " | 2.0 | 0.31 | 2.6 |
| 11 | Igepal CO430 Alipal CO433 | " | " | " | — | — | 5.0 |
| 12 | Igepal CO430 Alipal CO433 | " | " | " | — | 2.0 | 2.5 |
| 13 | Igepal CO430 Alipal CO433 | " | " | | | 1.75 | 2.5 |
| 14 | Igepal CO430 Alipal CO433 | " | " | | 3.0 | | 5.0 |
| 15 | Igepal CO430 Alipal CO433 | " | " | " | 1.2 | | 3.5 |
| 16 | Igepal CO430 Alipal CO433 | " | " | " | 3.0 | | 3.5 |
| 17 | Igepal CO430 Alipal CO433 | " | " | TBHP | | 2.0 | 2.5[a] |
| 18 | Igepal CO430 Alipal CO433 | " | " | TBHP | | 2.0 | 2.5[b] |

Peak pressures of from 800–1100 psig were reached during the polymerization runs.
[a]The NMA was added in 1.5 hours based upon a 3-hour reaction time.
[b]The NMA was added in 3 hours based upon a 5-hour reaction time.

In the above tables CAT refers to Catalyst, AA refers to acrylic acid, AM refers to acrylamide, NMA refers to N-methylol acrylamide and is expressed in percent on the basis of all vinyl acetate and estimated ethylene content added to the reaction. Triton X-301 is the sodium salt of alkylaryl polyether sulfate; Igepal 430 which is Igepal, 630 which is a acetylphenoxypoly(ethrespectively, for a period of about 1 minute and then removing. Tensile strengths are measured in the cross machine direction (CMD) at a chart speed of 0.5 inches per minute. The wicking time and sinking time are measured by ASTM test D-1117 and corresponds to a rate of absorption. Table II shows these results.

TABLE II

| RUN | % SOLIDS | VISC. | pH | ADD ON % | DRY lbs | WET lbs | PERCHLOR lbs | WICKING | SINKING |
|---|---|---|---|---|---|---|---|---|---|
| Tg-0° C. Control | 51.4 | 886 | 4.9 | 20 | 20.9 | 11.3 | 10.4 | 2'34" | 2.84' Ave |
| Tg-0° C. Control | 51.4 | 886 | 4.9 | 30 | 21.6 | 12.8 | 17.2 | 1'52"–3'47" | 4.78' |
| Tg-17° C. Control | | | | 10 | 12.3 | 6.6 | 6.99 | 14'24" Ave | |
| Tg-17° C. Control | | | | 10 | 13.7 | 5.8 | 6.1 | 14'24" Ave | |
| 1 | — | — | — | 11 | 13.7 | 5.8 | 7.0 | 2'10 | |

TABLE II-continued

| RUN | % SOLIDS | VISC. | pH | ADD ON % | DRY lbs | WET lbs | PERCHLOR lbs | WICKING | SINKING |
|---|---|---|---|---|---|---|---|---|---|
| 2 | — | — | — | 10 | 12.6 | 5.8 | 7.0 | 2'30 | |
| 3 | — | — | — | 10 | 11.5 | 4.69 | 7.49 | 2'30" | |
| 3A | — | — | — | 10 | 13.8 | 6.6 | 8.59 | 4'6" | |
| 4 | 55 | 225 | 5.4 | 20 | 19.2 | 9.3 | 9.6 | 14" | 14" |
| 5 | 47 | 34.2 | 5.1 | 20 | 21.1 | 10.4 | 10.8 | 24" | 23" |
| 6 | 53.8 | 244 | 5.0 | 20 | 208 | 10.4 | 16.7 | 39" | 39" |
| 7 | 55 | 106 | 4.8 | 20 | 17.1 | 8.8 | 9.8 | 49" | 49" |
| 8 | 54.4 | 84.5 | 4.5 | 30 | 22.9 | 11.5 | 11.4 | 11" | |
| 9 | 54.6 | 113.5 | 5.3 | 32 | 20.3 | 10.0 | 15.6 | 21" | |
| 10 | 54.6 | 95.0 | 4.7 | 31 | 23.0 | 9.9 | 18.3 | 13" | |
| 11 | 53.0 | 239 | 4.7 | 30 | 23.9 | 9.4 | 15.0 | 30" | |
| 12 | 53.1 | 140 | 4.3 | 10 | 11.5 | 4.5 | 6.4 | 18.6" | 17.4" |
| 13 | 55.2 | 247 | 4.5 | 22 | 19.6 | 9.4 | 9.5 | 38" | |
| 14 | 51.9 | 197 | 4.6 | 20 | 18.1 | 7.4 | 8.1 | 27" | |
| 15 | 52.9 | 56.2 | 4.7 | 19 | 18.4 | 7.3 | 7.1 | 25" | |
| 16 | 53.4 | 782 | 4.5 | 21 | 18.5 | 7.2 | 7.1 | 26" | |
| 17 | 54.4 | 50.6 | 4.5 | 20 | 18.1 | 9.5 | 6.7 | 39" | 39 |
| 18 | 53.9 | 73 | 4.8 | 20 | 16.5 | 8.8 | 5.8 | 80.4" | 80.4" |

From the above tables it can be seen that tensile strength of the non-woven goods prepared using the emulsions of this invention compare favorably with those of similar prior art commercial emulsions. The big difference is noted in the rate of absorption of the non-woven goods. There is a clear difference between the commercial emulsions and the emulsions of this invention. Wicking time for the emulsions of this invention which are comparable to the control emulsions namely 1–3A in time for the −17° C. Tg material is from about 2 minutes to about 5 minutes whereas the average for the commercial emulsion is approximately 14 minutes. When comparing runs 4–16 to the 0° C. Tg control wicking times of from about 10 to 60 seconds were recorded whereas wicking times of 2 minutes to about 3½ minutes were recorded for the control. These results clearly show that copolymers of this invention, regardless of the add-on quantity, resulted in significantly shorter wicking times than the commercially available vinyl acetate-ethylene-N-methylol acrylamide emulsions. Further, the runs showed that wicking time is substantially independent of the add-on of copolymer incorporated into the non-woven good or the type of monomer.

Triton X-301 is the sodium salt of alkylaryl polyether sulfate; Igepal 430 which is Igepal, 630 which is a acetylphenoxypoly(ethlenoxy) ethanol, Alipal 433 is a sodium salt of sulfated nonyl phenoxy poly(ethyleneoxy) ethanol.

What is claimed:

1. In a process for producing an aqueous emulsion suitably adapted for producing non-woven goods said emulsion containing a vinyl acetate-ethylene copolymer wherein said copolymer contains from about 60–96% by weight of vinyl acetete and is produced by (a) forming an aqueous suspension of vinyl acetate, ethylene, and stabilizer, (b) pressurizing the reactor with ethylene to form a vinyl acetate-ethylene raction mixture, (c) initiating the polymerizaton of the reaction mixture by the addition of catalyst, incrementally adding a crosslinkable monomer in a proportion of the 0.5–10% by weight of the copolymer, and (d) carrying out said polymerization at a temperature from 45°–85° C. of 10–100 atmospheres, the improvement for enhancing the absorptive properties of said copolymer which comprises:

pressurizing the reactor with ethylene to an initial ethylene equilibrium pressure of from about 100 to 1,000 psig;

initiating the reaction mixture by the addition of catalyst at a temperature from about 10°–35° C. and bringing the reaction mixture to a reaction temperature of from 45°–85° C. and operating pressure within a period of not more than 2 hours and the reaction temperature exceeds the initiation temperature by at least 20° C.;

adding the crosslinkable monomer at a substantially uniform rate such that the major portion of monomer has been added by the time the vinyl acetate content in the emulsion has been reduced to a level of from 3–25% by weight of the emulsion;

and continuing polymerization of the reaction mixture until the vinyl acetate content in said emulsion is reduced below about 1% by weight.

2. The process of claim 1 wherein said crosslinkable monomer is selected from the group consisting of N-methylol amides of acrylic and methacrylic acid; acrylic and methacrylic acid, unsaturated dicarboxylic acids, crotonic acid glycidyl esters of acrylic and methacrylic acid, allylcarbamate, acrylamide and the ethers of the amides of acrylic and methacrylic acid and allylcarbamate.

3. The process of claim 2 wherein said reaction pressure prior to initiation is from about 400–750 psig.

4. The process of claim 3 wherein said reactor temperature at the time of initiation is from about 20°–30° C.

5. The process of claim 4 wherein said crosslinkable monomer is added at a substantially uniform rate during the polymerization and said monomer addition is complete when the vinyl acetate content in the emulsion is from 3–8% by weight.

6. The process of claim 4 wherein said stabilizer is an anionic surfactant, or anionic-nonionic mixture or protective colloid-nonionic mixture.

7. A nonwoven fabric formed from a loosely assembled web of fibers bonded together with a vinyl acetate-ethylene copolymer wherein said copolymer formed by an improved process for producing an aqueous emulsion suitably adapted for producing non-woven goods said emulsion containing about 60–96% by weight of vinyl acetate and produced by forming an aqueous suspension comprising vinyl acetate, and stabilizer, charging said suspension to a reactor, pressurizing the reactor with ethylene to form a reaction mixture initiating the polymerization of the reaction mixture by the addition of a catalyst, and adding from about 0.5–10% by weight of the vinyl acetate of a cross-linkable monomer, the improvement for enhancing the properties of said emulsion which comprises:

pressurizing the reactor with ethylene to an initial ethylene equilibrium pressure of from about 100 to 1,000 psig;

initiating the reaction mixture by the addition of catalyst at a temperature from about 10°–35° C. and bringing the reaction mixture to a reaction temperature of from 45°–85° C. and operating pressure within a period of not more than 2 hours and the reaction temperature exceeds the initiation temperature by at least 20° C.;

adding the crosslinkable monomer at a substantially uniform rate such that the major portion of monomer has been added by the time the vinyl acetate content in the emulsion has been reduced to a level of from 3–25% by weight of the emulsion; and continuing polymerization of the reaction mixture until the vinyl acetate content in said emulsion is reduced below about 1% by weight.

8. The process of claim 7 wherein said crosslinkable monomer is selected from the group consisting of N-methylol amides of acrylic and methacrylic acid; acrylic and methacrylic acid, unsaturated dicarboxylic acids, crotonic acid glycidyl esters of acrylic and methacrylic acid, allylcarbamate, acrylamide and the ethers of the amides of acrylic and methacrylic acid and allylcarbamate.

9. The process of claim 8 wherein said reaction pressure prior to initiation is from about 400–750 psig.

10. The process of claim 9 wherein said reaction temperature at the time of initiation is from about 20°–30° C.

11. The process of claim 10 wherein said crosslinkable monomer is added at a substantially uniform rate during the polymerization and said monomer addition is complete when the vinyl acetate content in the emulsion is from 3–8% by weight.

12. The process of claim 11 wherein said stabilizer is an anionic surfactant, or mixture of anionic±nonionic surfactant or a mixture of protective colloid and nonionic surfactant.

* * * * *

UNITED STATES PATENT AND TRADEMARK OFFICE
CERTIFICATE OF CORRECTION

PATENT NO. : 4,332,850
DATED : 1 June 1982
INVENTOR(S) : John G. Iacoviello

It is certified that error appears in the above-identified patent and that said Letters Patent are hereby corrected as shown below:

Column 9, Line 60
    Delete "raction" and substitute therefor --reaction--

Column 12, Line 4
    Delete "process" and substitute therefor --nonwoven fabric--

Column 12, Line 12
    Delete "process" and substitute therefor --nonwoven fabric--

Column 12, Line 14
    Delete "process" and substitute therefor --nonwoven fabric--

Column 12, Line 17
    Delete "process" and substitute therefor --nonwoven fabric--

Column 12, Line 22
    Delete "process" and substitute therefor --nonwoven fabric--

Signed and Sealed this

Twenty-sixth Day of April 1983

[SEAL]

Attest:

Attesting Officer

GERALD J. MOSSINGHOFF
Commissioner of Patents and Trademarks